United States Patent
Roscoe et al.

(10) Patent No.: US 11,584,657 B2
(45) Date of Patent: Feb. 21, 2023

(54) SYSTEMS AND METHODS FOR ALUMINA PRODUCTION

(71) Applicant: SOLENIS TECHNOLOGIES, L.P., Wilmington, DE (US)

(72) Inventors: Clive Roscoe, Ryde (AU); Lawrence J. Andermann, Wilmington, DE (US)

(73) Assignee: Solenis Technologies, L.P., Wilmington, DE (US)

(*) Notice: Subject to any disclaimer, the term of this patent is extended or adjusted under 35 U.S.C. 154(b) by 714 days.

(21) Appl. No.: 16/524,819

(22) Filed: Jul. 29, 2019

(65) Prior Publication Data
US 2020/0031683 A1    Jan. 30, 2020

Related U.S. Application Data

(60) Provisional application No. 62/703,905, filed on Jul. 27, 2018.

(51) Int. Cl.
| | |
|---|---|
| *C01F 7/0653* | (2022.01) |
| *C01F 7/14* | (2022.01) |
| *C01F 7/46* | (2006.01) |
| *C01F 7/473* | (2022.01) |

(52) U.S. Cl.
CPC ............ *C01F 7/0653* (2013.01); *C01F 7/14* (2013.01); *C01F 7/46* (2013.01); *C01F 7/473* (2013.01)

(58) Field of Classification Search
CPC .. C01F 7/0653; C01F 7/14; C01F 7/46; C01F 7/473
See application file for complete search history.

(56) References Cited

U.S. PATENT DOCUMENTS

| | | | |
|---|---|---|---|
| 4,275,042 A | 6/1981 | Lever | |
| 4,578,255 A | 3/1986 | Roe et al. | |
| 4,789,485 A | 12/1988 | Field et al. | |
| 4,902,425 A | 2/1990 | Keeney | |
| 5,133,874 A * | 7/1992 | Spitzer ................. | B01D 21/01 |
| | | | 210/734 |
| 5,178,774 A | 1/1993 | Payne et al. | |
| 5,284,634 A | 2/1994 | Strominger et al. | |

(Continued)

FOREIGN PATENT DOCUMENTS

| | | |
|---|---|---|
| CN | 101628749 A | 1/2010 |
| EP | 0211338 A2 | 2/1987 |

(Continued)

OTHER PUBLICATIONS

ISA/US, International Search Report and Written Opinion issued in Int. Appl. No. PCT/US2019/043908 dated Oct. 24, 2019.

*Primary Examiner* — Anthony J Zimmer
(74) *Attorney, Agent, or Firm* — Lorenz & Kopf, LLP

(57) ABSTRACT

A method for isolating a humic substance from alumina process liquor is provided herein. Separate from or within the method, bauxite is processed to form the alumina process liquor. The method includes providing a diallyldimethylammonium chloride-containing polymer. The method further includes providing an amine-containing polymer. The method further includes combining the diallyl dimethyl ammonium chloride, the amine-containing polymer, and the alumina process liquor, to isolate the humic substance from the alumina process liquor.

14 Claims, 2 Drawing Sheets

(56) References Cited

U.S. PATENT DOCUMENTS

| | | | |
|---|---|---|---|
| 5,427,750 A * | 6/1995 | Sommese | ............... C01F 7/473 |
| | | | 210/734 |
| 5,547,647 A | 8/1996 | Moody et al. | |
| 6,555,077 B1 | 4/2003 | Rosenberg et al. | |
| 7,264,736 B2 | 9/2007 | Kuboth | |
| 2004/0024156 A1 * | 2/2004 | Quadir | ...................... C01F 7/47 |
| | | | 526/317.1 |
| 2004/0131521 A1 | 7/2004 | Kuboth | |

FOREIGN PATENT DOCUMENTS

| | | |
|---|---|---|
| RU | 2294390 C2 | 2/2007 |
| SU | 1604152 A3 | 10/1990 |

* cited by examiner

SYSTEMS AND METHODS FOR ALUMINA PRODUCTION

CROSS-REFERENCE TO RELATED APPLICATIONS

This application claims the benefit of U.S. Provisional Application No. 62/703,905, filed Jul. 27, 2018.

TECHNICAL FIELD

The present disclosure generally relates to compositions, systems, and methods for alumina production and more particularly relates to compositions, systems, and methods for isolation of a humic substance from alumina process liquor.

BACKGROUND

Alumina is generally produced by digesting bauxite in aqueous caustic to form a product including sodium aluminate and red mud. The alumina is then recovered by separating the red mud from sodium aluminate liquor in a separating stage, and separating alumina from the separated sodium aluminate liquor in an alumina recovery circuit.

This process is generally known as the Bayer process and is operated as a cyclic process with a minimum of escape of used caustic. Thus, caustic liquor is recycled continuously in the process from the digestion stage to the separating stage and is returned, with fresh bauxite, into the digestion stage. Caustic liquor may be recycled in this manner for many years.

A considerable amount of impurities results or are released from the bauxite during digestion, which must be separated from the desired alumina constituent. In particular, the red mud includes soluble materials, such as humic substances. Generally, these humic substances appear as very fine particles which are difficult to separate out in a timely, cost-effective manner. The presence of humic substances can interfere with the recovery of alumina in the separating stage and, in particular, can interfere with the crystallization of aluminum hydrate from the caustic liquor. The red mud which usually constitutes about 30-50% by weight of the ore must be rapidly and cleanly separated from the sodium aluminate liquor in order to make separation of the alumina economically efficient. If the rate of separation is too slow, output is materially diminished and overall process efficiency impaired. Likewise, if the separation is not clean, the resultant alumina in the form of aluminate is somewhat crude and undesirable for a number of end-uses. For instance, brightness of the alumina is important when used in products, such as paper coatings.

Conventional methods for removing humic substances include the use of a coagulant or flocculant, such as a polymeric cationic amine, for promoting separation of humates from aqueous liquids during digestion. Other conventional methods include the use of a coagulant or flocculant, such as a cationic polymeric quaternary ammonium compound, applied to the solids of the red mud after digestion. However, both methods provide inferior removal efficiency of the humic substances from the alumina process liquor.

Accordingly, it is desirable to provide compositions, systems, and methods for isolation of a humic substance from alumina process liquor. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a composition for isolation of a humic substance from alumina process liquor, and various non-limiting embodiments of systems and methods for the same, are disclosed herein.

In a non-limiting embodiment, a method for isolating a humic substance from alumina process liquor is provided herein. Separate from or within the method, bauxite is processed to form the alumina process liquor. The method includes providing a diallyldimethylammonium chloride-containing polymer. The method further includes providing an amine-containing polymer. The method further includes combining the diallyl dimethyl ammonium chloride, the amine-containing polymer, and the alumina process liquor, to isolate the humic substance from the alumina process liquor.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
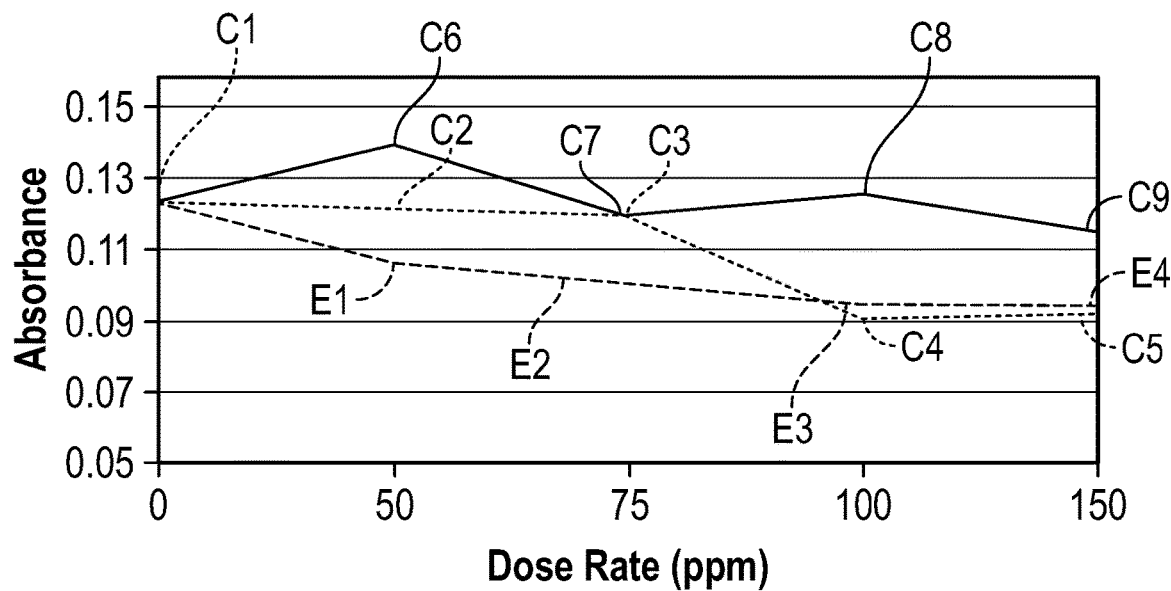
FIG. 1 is a chart illustrating experimental data of a non-limiting embodiment of the method for isolating a humic substance from alumina process liquor.

The following detailed description is merely exemplary in nature and is not intended to limit the compositions, systems, and methods as described herein. Furthermore, there is no intention to be bound by any theory presented in the preceding background or the following detailed description.

The following description provides specific details, such as materials and dimensions, to provide a thorough understanding of the present disclosure. The skilled artisan, however, will appreciate that the present disclosure can be practiced without employing these specific details. Indeed, the present disclosure can be practiced in conjunction with processing, manufacturing, or fabricating techniques conventionally used in the mining industry. Moreover, the processes below describe only steps, rather than a complete process flow, according to the present disclosure.

As used herein, "a," "an," or "the" means one or more unless otherwise specified. The term "or" can be conjunctive or disjunctive. Open terms such as "include," "including," "contain," "containing" and the like mean "comprising." The term "about" as used in connection with a numerical value throughout the specification and the claims denotes an interval of accuracy, familiar and acceptable to a person skilled in the art. In general, such interval of accuracy is ±10%. Thus, "about ten" means 9 to 11. All numbers in this description indicating amounts, ratios of materials, physical properties of materials, and/or use are to be understood as modified by the word "about," except as otherwise explicitly indicated. As used herein, the "%" described in the present disclosure refers to the weight percentage unless otherwise indicated. As used herein, the phrase "substantially free of" means that a composition contains little or no specified ingredient/component, such as less than about 1 wt %, 0.5 wt %, or 0.1 wt %, or below the detectable level of the specified ingredient. Unless stated otherwise, molecular weight of a polymer refers to weight average molecular weight.

A method for isolating a humic substance from alumina process liquor is provided herein. Separate from or within the method, bauxite is processed to form the alumina process liquor. The method includes providing a diallyldimethylammonium chloride-containing polymer. The method further includes providing an amine-containing polymer. The method further includes combining the diallyl dimethyl ammonium chloride, the amine-containing polymer, and the alumina process liquor, to isolate the humic substance from the alumina process liquor.

A typical humic substance is a mixture of many molecules, some of which are based on a motif of aromatic nuclei with phenolic and carboxylic substituents, linked together. The functional groups that may contribute most to surface charge and reactivity of humic substances are phenolic and carboxylic groups. The humic substance may be selected from the group of humic acid, fulvic acid, and a combination thereof. In certain embodiments, the humic substance includes, or is further defined as, humic acid.

The diallyldimethylammonium chloride-containing polymer may be a water-soluble, cationic, polymeric quaternary ammonium salt. The diallyldimethylammonium chloride-containing polymer may include polydiallyldimethylammonium chloride (POLYDADMAC) formed from the monomer diallyldimethylammonium chloride (DADMAC). Polymerization of this monomer may be accomplished by standard vinyl polymerization techniques, but in embodiments, it is completed by free radical initiation of this vinylic monomer, in the presence or absence of other vinylic monomers such as acrylamide, methylacrylate, and the like. Polymerization may be accomplished with the DADMAC monomer alone, leading to the homopolymer POLYDADMAC, or with DADMAC and other vinylic monomers, leading to DADMAC-containing copolymers. The diallyldimethylammonium chloride-containing polymer may have a weight average molecular weight in an amount of from about 100,000 to about 500,000, alternatively from about 100,000 to about 300,000, or alternatively from about 150,000 to about 250,000. In certain embodiments, the diallyldimethylammonium chloride-containing polymer is provided as a liquid. Examples of suitable diallyldimethylammonium chloride-containing polymers are commercially available from Solenis International LP under the tradenames Praestol 187K and Praestol 187KH.

The amine-containing polymer may include a polyamine. Examples of suitable polyamines include, but are not limited to, polyethyleneimine, polyvinylamine, polyallylamine, polydimethylamine, copolymers thereof, and combinations thereof. In certain embodiments, the polyamine includes, or is further defined as, poly(dimethylamine-co-epichlorohydrin). The polyamine may have a weight average molecular weight in an amount of from about 50,000 to about 300,000, alternatively from about 75,000 to about 250,000, or alternatively from about 100,000 to about 200,000. In certain embodiments, the amine-containing polymer may include the reaction product of the polyamine and an amine-functionalized crosslinking agent containing two or more amine moieties. Examples of suitable amine-functionalized crosslinking agents include, but are not limited to, alkylenediamines, polypropylenepolyamines, polyethylenepolyamines, and combinations thereof. In various embodiments, the amine-functionalized crosslinking agent may include ethylene diamine. In an exemplary embodiment, the amine-containing polymer includes the reaction product of poly(dimethylamine-co-epichlorohydrin) and ethylene diamine. In certain embodiments, the amine-containing polymer is provided as a liquid. Examples of suitable amine-containing polymers are commercially available from Solenis International LP under the tradename Praestol 193K.

In various embodiments, the alumina process liquor includes bauxite and sodium hydroxide. The alumina process liquor may be formed from the Bayer process. In the Bayer process, bauxite may be heated in a pressure vessel along with a sodium hydroxide solution (caustic soda) at a temperature of from about 135 to about 245° C. The humic substance may be released from the bauxite into the alumina process liquor. In these embodiments, the diallyl dimethyl ammonium chloride and the amine-containing polymer are combined with the alumina process liquor after the bauxite and the sodium hydroxide have been combined. The alumina process liquor may include the diallyl dimethyl ammonium chloride and the amine-containing polymer in a weight ratio of from about 1:99 to about 99:1, alternatively from about 5:95 to about 95:5, alternatively from about 1:10 to about 10:1, or alternative from about 1:2 to about 2:1. The alumina process liquor may include the diallyl dimethyl ammonium chloride and the amine-containing polymer in a combined amount of from about 1 to about 2000 ppm, alternatively from about 3 to about 1500 ppm, or alternatively from about 5 to about 1000 ppm based on a total amount of the alumina process liquor.

In various embodiments, the method further comprises the step of separating the bauxite from the alumina process liquor prior to combining the diallyldimethylammonium chloride-containing polymer, the amine-containing polymer, and the alumina process liquor, to isolate the humic substance from the alumina process liquor. In these embodiments, the bauxite separated from the alumina process liquor may be residual bauxite that has not been fully digested. In various embodiments, the method further comprises the step of separating the red mud from the alumina process liquor prior to combining the diallyldimethylammonium chloride-containing polymer, the amine-containing polymer, and the alumina process liquor, to isolate the humic substance from the alumina process liquor. It is to be appreciated that the steps of separating the residual bauxite and the red mud may be performed during the same step.

The step of combining the diallyldimethylammonium chloride-containing polymer, the amine-containing polymer, and the alumina process liquor may be performed by a single step or may be performed by multiple steps. For example, the diallyldimethylammonium chloride-containing polymer and the amine-containing polymer may be individually combined with the alumina process liquor by different steps. Further, portions of the diallyldimethylammonium chloride-containing polymer and/or portions of the amine-containing polymer may be combined with the alumina process liquor by multiple steps. In one exemplary embodiment, the diallyldimethylammonium chloride-containing polymer and the amine-containing polymer are combined to form a mixture and then the mixture is combined with the alumina process liquor. In another exemplary embodiment, the diallyldimethylammonium chloride-containing polymer is combined with the alumina process liquor and then the amine-containing polymer combined with the alumina process liquor already including the diallyldimethylammonium chloride-containing polymer. In another exemplary embodiment, the amine-containing polymer is combined with the alumina process liquor and then the diallyldimethylammonium chloride-containing polymer combined with the alumina process liquor already including the amine-containing polymer.

The alumina process liquor including the diallyl dimethyl ammonium chloride and the amine-containing polymer exhibits a reduced absorbance at 691 nm as compared to an alumina process liquor including only one of the diallyl dimethyl ammonium chloride and the amine-containing polymer, based on an equal actives basis. The terminology "actives" as utilized herein regarding reduced absorbance at 691 nm means the alumina process liquors, to be compared, include equal amounts of active components, such as bauxite and caustic. In various embodiments, a reduction in absorbance at 691 nm of the alumina process liquor represents a reduction in an amount of organic compounds contained within the alumina process liquor. In certain embodiments, a reduction in absorbance at 691 nm of the alumina process liquor represents a reduction in an amount of humic substances contained within the alumina process liquor.

Determination of absorbance at 691 nm of the alumina process liquor may be performed utilizing a spectrophotometer commercially available from Xylem Analytics Germany GmbH having the tradename photoLab 7600 UV-VIS Model. The spectrophotometer may be operated using a 10 mm UV light path and Semi-Micro Cells from VWR International. Prior to analysis of the sample of the alumina process liquor including the diallyl dimethyl ammonium chloride and the amine-containing polymer, the sample may be filtered through a Whatman #50 (or equivalent) filter paper to remove particulate formed from the combination of the diallyl dimethyl ammonium chloride and the amine-containing polymer with the alumina process liquor. In certain embodiments, it is believed that organic compounds, such as the humic substances, are isolated from the alumina process liquor in the presence of the combination of the diallyl dimethyl ammonium chloride and the amine-containing polymer. It is to be appreciated that it may not be necessary to remove the humic substances from the alumina process liquor to isolate the humic substances from the alumina process liquor. In other words, isolation of the humic substances from the alumina process liquor may only require separation of the humic substances from the solution of the alumina process liquor, such as by precipitation of the humic substances out of the solution of the alumina process liquor.

A method for producing alumina is also provided herein. The method may include the steps of removing organic material from bauxite by washing the bauxite with an aqueous alkali wash liquor in a washing stage, separating the washed bauxite from the wash liquor, separating organic material from the wash liquor, digesting the washed bauxite with aqueous caustic in a digestion stage to form a digestion product including sodium aluminate and red mud, separating sodium aluminate liquor from the red mud in a separating stage, recovering alumina from the sodium aluminate liquor in an alumina recovery circuit, and recycling caustic from the alumina recovery circuit to the digestion stage. The alumina process liquor may have a caustic content of at least about 30 g/l, alternatively at least about 40 g/l, or alternatively at least about 50 g/l, measured as sodium hydroxide and based on a total volume of the alumina process liquor. The alumina process liquor may further include aqueous caustic from the alumina recovery circuit and, after recovering organic material from the wash liquor, the wash liquor is included in the digestion stage, the separating stage, or the alumina recovery circuit. The step of combining the diallyldimethylammonium chloride-containing polymer, the amine-containing polymer, and the alumina process liquor, to isolate the humic substance from the alumina process liquor may be performed before the washing stage, during the washing stage, in the digestion stage, in the alumina recovery circuit, or combinations thereof.

Loss of alumina from the bauxite is avoided by recycling the wash liquor, after removal of the organic material, back into the caustic liquors that are processed through the digestion stage, separation stage, or the aluminum recovery circuit. Thus, for instance, the wash liquor, after removal of the organic material, may be fed to the separation stage, and in embodiments, may be fed to the inlet or the outlet of the primary settler, where the red mud is flocculated and separated from the sodium aluminate liquor. Instead of being fed directly to, for instance, the inlet of the primary settler, the wash liquor from which the organic material has been removed could be included in the separating stage by being added to liquor that is fed to the separating stage from the red mud washing stages. For instance, it could be added to the first or second washing stages and thus carried back from the first stage into the primary settler. Alternatively, the liquor from which the organic material has been removed can be included in the alumina recovery circuit, generally prior to the filters that precede the crystallization stages, or after the crystallization stages.

The aqueous wash liquor includes standard return liquor, i.e., liquor that is returning from the alumina recovery circuit, at which alumina (as aluminum trihydrate) has been crystallized from sodium aluminate liquor. Fresh caustic soda is normally added between the crystallization and digestion stages and the wash liquor may be the liquor that exists before, or more usually after, this addition of fresh caustic soda.

In exemplary embodiments, aspects of the disclosure include, but are not limited to:

1. A method for isolating a humic substance from alumina process liquor, wherein bauxite is processed to form the alumina process liquor, the method comprising:
providing a diallyldimethylammonium chloride-containing polymer;
providing an amine-containing polymer; and
combining the diallyl dimethyl ammonium chloride, the amine-containing polymer, and the alumina process liquor, to isolate the humic substance from the alumina process liquor.

2. The method of aspect 1, wherein the humic substance is selected from the group of humic acid, fulvic acid, and combinations thereof.

3. The method of aspect 1, wherein the diallyldimethylammonium chloride-containing polymer comprises polydiallyldimethylammonium chloride.

4. The method of aspect 1, wherein the amine-containing polymer comprises a polyamine.

5. The method of aspect 4, wherein the polyamine comprises poly(dimethylamine-co-epichlorohydrin).

6. The method of aspect 4, wherein the amine-containing polymer comprises the reaction product of a polyamine and an amine-functionalized crosslinking agent containing two or more amine moieties.

7. The method of aspect 4, wherein the amine-functionalized crosslinking agent comprises ethylene diamine.

8. The method of aspect 1 further comprising the step of separating bauxite from the alumina process liquor prior to combining the diallyl dimethyl ammonium chloride, the amine-containing polymer, and the alumina process liquor, to isolate the humic substance from the alumina process liquor.

9. The method of aspect 1, wherein the alumina process liquor comprises sodium hydroxide.

10. The method of aspect 1, wherein the alumina process liquor comprises the diallyl dimethyl ammonium chloride and the amine-containing polymer in a weight ratio of from 1:99 to 99:1.

11. The method of aspect 1, wherein the alumina process liquor comprises the diallyl dimethyl ammonium chloride and the amine-containing polymer in a combined amount of from about 5 ppm to about 1000 ppm based on a total amount of the alumina process liquor.

12. The method of aspect 11, wherein the alumina process liquor comprising the diallyl dimethyl ammonium chloride and the amine-containing polymer exhibits a reduced absorbance at 691 nm as compared to an alumina process liquor comprising only one of the diallyl dimethyl ammonium chloride and the amine-containing polymer, based on an equal actives basis.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

EXAMPLES

Example 1: Evaluation of Absorbance Reduction of Exemplary and Comparative Compositions Exemplary compositions (E1-E4) and comparative compositions (C1-C9) were prepared in accordance with Table 1. The exemplary and comparative compositions were evaluated for the reduction in absorbance at 691 nm as an indicator for efficacy in isolating humic substances. Determination of absorbance at 691 nm of alumina process liquor samples including the exemplary and comparative compositions was performed utilizing a spectrophotometer commercially available from Xylem Analytics Germany GmbH having the tradename photoLab 7600 UV-VIS Model. The spectrophotometer was operated using 10 mm light path UV and Semi-Micro Cells from VWR International. Prior to analysis of the samples of the alumina process liquor, the samples were filtered through a Whatman #50 filter paper and heated to 90±3° C. on a stirrer hotplate with mild agitation. The exemplary and comparative compositions were then combined with the samples of the alumina process liquor under continued heat and agitation for 30 minutes. The samples including the exemplary and comparative compositions were then allowed to cool and filtered through Whatman #50 filter paper. Analysis of the samples including the samples including the exemplary and comparative compositions was then performed. Results of the evaluation are provided in FIG. 1.

TABLE 1

| | DADMAC-containing polymer I (dosage rate in ppm) | DADMAC-containing polymer II (dosage rate in ppm) | Amine-containing polymer I (dosage rate in ppm) | Amine-containing polymer II (dosage rate in ppm) |
|---|---|---|---|---|
| C1 | — | — | — | — |
| C2 | 50 | — | — | — |
| C3 | 75 | — | — | — |
| C4 | 100 | — | — | — |
| C5 | 150 | — | — | — |
| C6 | — | — | 50 | — |
| C7 | — | — | 75 | — |
| C8 | — | — | 100 | — |
| C9 | — | — | 150 | — |
| E1 | — | 25 | — | 25 |
| E2 | — | 37.5 | — | 37.5 |
| E3 | — | 50 | — | 50 |
| E4 | — | 75 | — | 75 |

DADMAC-containing polymer I is a polydiallyldimethylammonium chloride commercially available from SNF China Flocculant Co. Ltd.
DADMAC-containing polymer II is a polydiallyldimethylammonium chloride commercially available from Solenis International LP under the tradename Praestol 187K.
Amine-containing polymer I is a poly(dimethylamine-co-epichlorohydrin) commercially available from SNF China Flocculant Co. Ltd.
Amine-containing polymer II is a reaction product of poly(dimethylamine-co-epichlorohydrin) and ethylene diamine commercially available from Solenis International LP under the tradename Praestol 193K.

As shown in FIG. 1, the exemplary compositions (E1-E4) generally exhibit a reduced absorption at 691 nm as compared to the comparative compositions (C1-C9). Without being bound by theory, it is believed that the blends of a diallyldimethylammonium chloride-containing polymer and an amine-containing polymer exhibit synergistic effects in that these blends provide superior isolation of humic substances as compared to the individual components alone.

Example 2: Evaluation of Absorbance Reduction of Exemplary and Comparative Compositions Exemplary compositions (E5-E8) and comparative compositions (C10-C18) were prepared in accordance with Table 2. The exemplary and comparative compositions were evaluated for the reduction in absorbance at 691 nm as an indicator for efficacy in isolating humic substances. Results of the evaluation are provided in FIG. 2.

TABLE 2

| | DADMAC-containing polymer II (dosage rate in ppm) | Amine-containing polymer II (dosage rate in ppm) |
|---|---|---|
| C10 | — | — |
| C11 | 50 | — |
| C12 | 75 | — |
| C13 | 100 | — |
| C14 | 150 | — |
| C15 | — | 50 |
| C16 | — | 75 |
| C17 | — | 100 |
| C18 | — | 150 |
| E5 | 25 | 25 |
| E6 | 37.5 | 37.5 |
| E7 | 50 | 50 |
| E8 | 75 | 75 |

DADMAC-containing polymer II is a linear polydiallyldimethylammonium chloride commercially available from Solenis International LP under the tradename Praestol 187K.
Amine-containing polymer II is a reaction product of poly(dimethylamine-co-epichlorohydrin) and ethylene diamine commercially available from Solenis International LP under the tradename Praestol 193K.

Figure 2:
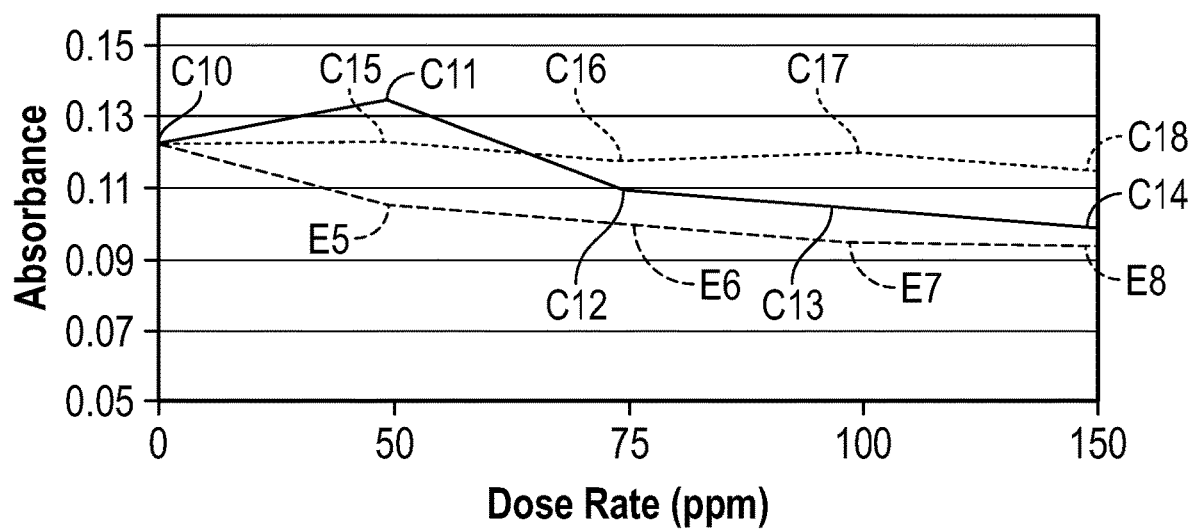
FIG. 2 is a chart illustrating experimental data of another non-limiting embodiment of the method for isolating a humic substance from alumina process liquor.

As shown in FIG. 2, the exemplary compositions (E5-E8) generally exhibit a reduced absorption at 691 nm as compared to the comparative compositions (C10-C18). Without being bound by theory, it is once again believed that the blends of a diallyldimethylammonium chloride-containing polymer and an amine-containing polymer exhibit synergistic effects in that these blends provide superior isolation of humic substances as compared to the individual components alone.

Example 3: Evaluation of Absorbance Reduction of Exemplary and Comparative Compositions Exemplary compositions (E9-E14) and a comparative composition (C11) were prepared in accordance with Table 3. The exemplary and comparative compositions were evaluated for the reduction in absorbance at 691 nm as an indicator for efficacy in isolating humic substances. Results of the evaluation are provided in FIG. 3.

TABLE 1

| | DADMAC-containing polymer II (dosage rate in ppm) | DADMAC-containing polymer III (dosage rate in ppm) | Amine-containing polymer II (dosage rate in ppm) |
|---|---|---|---|
| C19 | — | — | — |
| E9 | — | 50 | 50 |
| E10 | — | 75 | 75 |
| E11 | — | 100 | 100 |
| E12 | 50 | — | 50 |
| E13 | 75 | — | 75 |
| E14 | 100 | — | 100 |

DADMAC-containing polymer II is a linear polydiallyldimethylammonium chloride commercially available from Solenis International LP under the tradename Praestol 187K.
DADMAC-containing polymer III is a linear polydiallyldimethylammonium chloride commercially available from Solenis International LP under the tradename Praestol 187KH.
Amine-containing polymer II is a reaction product of poly(dimethylamine-co-epichlorohydrin) and ethylene diamine commercially available from Solenis International LP under the tradename Praestol 193K.

Figure 3:
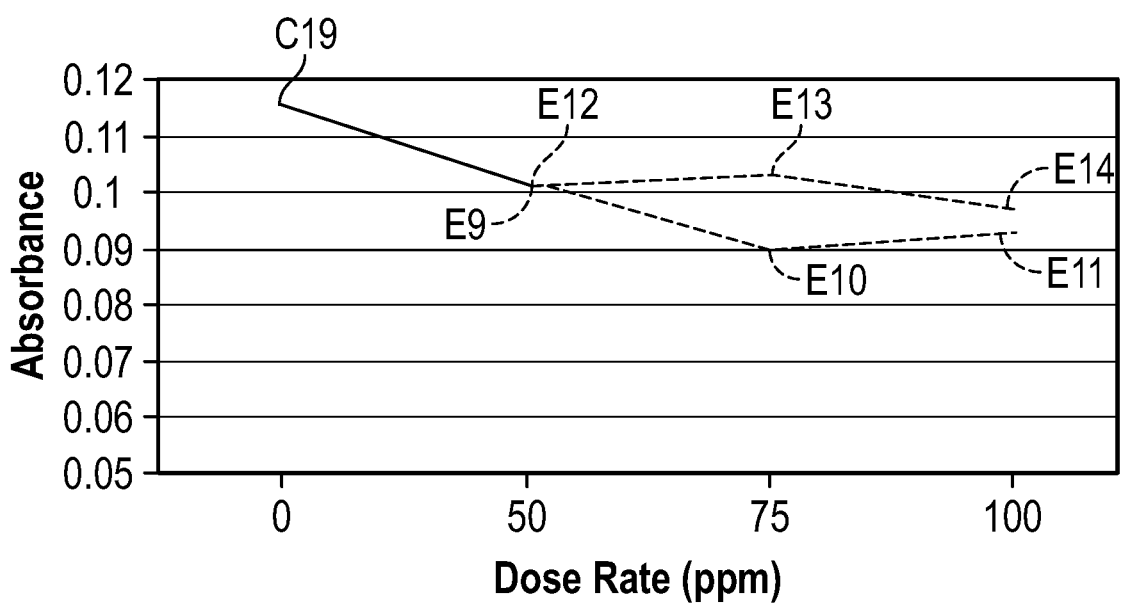
FIG. 3 is a chart illustrating experimental data of another non-limiting embodiment of the method for isolating a humic substance from alumina process liquor.

As shown in FIG. 3, the exemplary compositions (E9-E14) generally exhibit a reduced absorption at 691 nm as compared to the comparative composition (C19). Without being bound by theory, it is believed that the blends of a diallyldimethylammonium chloride-containing polymer and an amine-containing polymer exhibit synergistic effects in that these blends provide superior isolation of humic substances as compared to the individual components alone.

What is claimed is:

1. A method for isolating a humic substance from alumina process liquor, wherein bauxite is processed to form the alumina process liquor, the method comprising:
   providing a diallyldimethylammonium chloride-containing polymer;
   providing an amine-containing polymer chosen from polyethyleneimine, polyallylamine, polydimethylamine, or copolymers thereof; the reaction product of a polyamine and an amine-functionalized crosslinking agent containing two or more amine moieties; and combinations thereof; and
   combining the diallyl dimethyl ammonium chloride, the amine-containing polymer, and the alumina process liquor to isolate the humic substance from the alumina process liquor.

2. The method of claim 1, wherein the humic substance is selected from the group of humic acid, fulvic acid, and combinations thereof.

3. The method of claim 1, wherein the diallyldimethylammonium chloride-containing polymer comprises polydiallyldimethylammonium chloride.

4. The method of claim 1, wherein the diallyldimethylammonium chloride-containing polymer is polydiallyldimethylammonium chloride.

5. The method of claim 1, wherein the amine-containing polymer is poly(dimethylamine-co-epichlorohydrin).

6. The method of claim 1, wherein the amine-containing polymer comprises the reaction product of a polyamine and an amine-functionalized crosslinking agent containing two or more amine moieties.

7. The method of claim 6, wherein the amine-functionalized crosslinking agent comprises ethylene diamine.

8. The method of claim 1 further comprising the step of separating bauxite from the alumina process liquor prior to combining the diallyl dimethyl ammonium chloride, the amine-containing polymer, and the alumina process liquor.

9. The method of claim 1, wherein the alumina process liquor comprises sodium hydroxide.

10. The method of claim 1, wherein the alumina process liquor comprises the diallyldimethylammonium chloride-containing polymer and the amine-containing polymer in a weight ratio of from 1:99 to 99:1.

11. The method of claim 1, wherein the alumina process liquor comprises the diallyldimethylammonium chloride-containing polymer and the amine-containing polymer in a weight ratio of from 1:2 to 2:1.

12. The method of claim 1, wherein the alumina process liquor comprises the diallyldimethylammonium chloride-containing polymer and the amine-containing polymer in a combined amount of from about 5 ppm to about 1000 ppm based on a total amount of the alumina process liquor.

13. The method of claim 1, wherein the alumina process liquor comprises the diallyldimethylammonium chloride-containing polymer and the amine-containing polymer in a combined amount of from about 50 ppm to about 200 ppm based on a total amount of the alumina process liquor.

14. A method for isolating a humic substance from alumina process liquor, wherein bauxite is processed to form the alumina process liquor, the method comprising:
   providing polydiallyldimethylammonium chloride;
   providing poly(dimethylamine-co-epichlorohydrin); and
   combining the polydiallyldimethylammonium chloride, the poly(dimethylamine-co-epichlorohydrin), and the alumina process liquor to isolate the humic substance from the alumina process liquor, wherein the polydiallyldimethylammonium chloride and the poly(dimethylamine-co-epichlorohydrin) are combined in a weight ratio of from 1:2 to 2:1 and in a combined amount of from about 50 ppm to about 200 ppm based on a total amount of the alumina process liquor.

* * * * *